US009462495B2

(12) United States Patent
Topaltzas et al.

(10) Patent No.: US 9,462,495 B2
(45) Date of Patent: *Oct. 4, 2016

(54) SYSTEM AND METHOD FOR EVALUATING PERFORMANCE OF CONCURRENT MOBILE SERVICES OF MOBILE DEVICES

(71) Applicant: Spirent Communications, Inc., Sunnyvale, CA (US)

(72) Inventors: Dimitrios M. Topaltzas, Ellicott City, MD (US); Jeffrey Horner, Leesburg, VA (US); Carl Magnus Lidman, Bethesda, MD (US); Jonathan Patrick O'Keefe, San Francisco, CA (US); Andrea Holt, Ijamsville, MD (US); Evan Henry, Arlington, VA (US); Simon Paul Bone, Arlington, VA (US); Lauren Belella, Smithsburg, MD (US)

(73) Assignee: Spirent Communications, Inc., Sunnyvale, CA (US)

( * ) Notice: Subject to any disclaimer, the term of this patent is extended or adjusted under 35 U.S.C. 154(b) by 124 days.

This patent is subject to a terminal disclaimer.

(21) Appl. No.: 14/559,839

(22) Filed: Dec. 3, 2014

(65) Prior Publication Data

US 2015/0085672 A1 Mar. 26, 2015

Related U.S. Application Data

(63) Continuation of application No. 13/492,380, filed on Jun. 8, 2012, now Pat. No. 8,909,213.

(51) Int. Cl.
*H04W 24/06* (2009.01)
*H04M 3/22* (2006.01)
*H04W 88/02* (2009.01)
*H04M 3/24* (2006.01)

(52) U.S. Cl.
CPC .......... *H04W 24/06* (2013.01); *H04M 3/2227* (2013.01); *H04M 3/242* (2013.01); *H04W 88/02* (2013.01)

(58) Field of Classification Search
CPC . H04W 24/06; H04W 88/02; H04M 3/2227; H04M 3/242
USPC ........................... 455/423–425, 67.11–67.16
See application file for complete search history.

(56) References Cited

U.S. PATENT DOCUMENTS

| | | | |
|---|---|---|---|
| 6,970,697 B2 * | 11/2005 | Kouznetsov | G06F 21/562 455/418 |
| 7,117,158 B2 | 10/2006 | Weldon et al. | |
| 7,287,072 B1 | 10/2007 | Dispensa et al. | |
| 7,751,813 B2 * | 7/2010 | Varanda | H04M 1/24 379/68 |

(Continued)

*Primary Examiner* — Sharad Rampuria
(74) *Attorney, Agent, or Firm* — Haynes Beffel & Wolfeld LLP; Ernest J. Beffel, Jr.

(57) ABSTRACT

A system method and device for evaluating the Quality of Service (QoS) performance of mobile telephone devices in the concurrent performance of different services through a mobile telephone network is provided. In one embodiment, the method comprises establishing a first logical communication channel via the mobile telephone network, communicating first information over the first logical communication channel, establishing a second logical communication channel over a communication network, concurrently with said communicating first information, communicating second information over the second logical communication channel, and determining a plurality of service quality metrics for the first and second information communicated over the first and second logical communication channel.

25 Claims, 3 Drawing Sheets

(56) References Cited

U.S. PATENT DOCUMENTS

| | | | |
|---|---|---|---|
| 7,756,484 B2 | 7/2010 | Topaltzas et al. | |
| 7,957,731 B2 * | 6/2011 | Topaltzas | H04W 24/06 455/422.1 |
| 8,023,937 B2 * | 9/2011 | Fok | H04W 24/00 455/418 |
| 8,064,900 B2 * | 11/2011 | Topaltzas | H04W 24/06 370/241 |
| 8,315,655 B1 * | 11/2012 | Cole | H04W 4/00 455/423 |
| 8,655,336 B1 * | 2/2014 | Dempski | H04L 41/5074 370/310.2 |
| 8,699,959 B2 * | 4/2014 | Topaltzas | H04M 3/2236 370/251 |
| 8,700,030 B1 * | 4/2014 | Cole | H04W 1/24 455/425 |
| 8,737,980 B2 | 5/2014 | Doshi et al. | |
| 8,874,043 B2 * | 10/2014 | Topaltzas | H04W 24/08 455/513 |
| 8,909,213 B2 | 12/2014 | Topaltzas et al. | |
| 9,232,420 B1 * | 1/2016 | Akiti | H04W 24/06 |
| 2005/0286685 A1 | 12/2005 | Vukovljak et al. | |
| 2006/0259629 A1 * | 11/2006 | Usmani | G06F 11/3688 709/227 |
| 2007/0213038 A1 | 9/2007 | Masseroni et al. | |
| 2009/0279673 A1 | 11/2009 | Maffre et al. | |
| 2010/0146488 A1 | 6/2010 | Chen et al. | |
| 2012/0198279 A1 * | 8/2012 | Schroeder | G06F 11/3672 714/32 |
| 2013/0007520 A1 | 1/2013 | Giammarresi et al. | |
| 2013/0136253 A1 | 5/2013 | Liberman Ben-Ami et al. | |

* cited by examiner

SYSTEM AND METHOD FOR EVALUATING PERFORMANCE OF CONCURRENT MOBILE SERVICES OF MOBILE DEVICES

CLAIM OF PRIORITY

This application is a continuation of U.S. patent application Ser. No. 13/492,380 entitled SYSTEM AND METHOD FOR EVALUATING PERFORMANCE OF CONCURRENT MOBILE SERVICES OF MOBILE DEVICES, filed Jun. 8, 2012 (SPIR 1078-1), the entire contents of which are incorporated herein by reference.

FIELD OF THE INVENTION

The present invention generally relates to systems and methods for evaluating communication devices, and more particularly to systems and methods for evaluating the performance of mobile telephone devices in the concurrent performance of different services through a mobile telephone network.

BACKGROUND OF THE INVENTION

Mobile telephone devices have become ubiquitous in our society. Unlike conventional landline telephony services, which typically operate in a home or office and are delivered via a wire or cable and enjoy a highly consistent transmission quality, mobile telephone devices are subjected to use under varying radio environments which results in highly varying transmission quality and thus highly varying speech and data service performance to the end user. One challenge to those designing mobile telephone devices is to design the telephone devices to provide the desired speech and data quality even when the user is using the telephone device in challenging and changing radio environments. Further, wireless network operators also want users of their network to use telephone devices that provide adequate communication quality in all radio environments to ensure that the user has a satisfactory experience using the wireless network. Thus, there are numerous parties who desire to test the quality of communications provided by a mobile telephone device.

There are, however, a wide variety of telephone devices used for communicating over wireless mobile telephone networks. With the proliferation of mobile telephone devices, many designs of telephones have evolved. The different designs of telephone devices result in different performance characteristics for each telephone device. Various design characteristics may impact the quality of the speech and data services provided by a telephone device and its ability to provide communications in varying radio environments. For example, the radio front-end of a telephone device, which drives, in part, the radiated performance (a devices ability to receive and transmit radio signals) of the device may positively or negatively impact the quality of communications in various radio environments. Another factor may be the device's capability to cancel interfering radio signals from wanted radio signals in order to reduce the signal-to-noise ratio and thereby improve the quality of communications. Other design factors include (a) the performance of the device's digital signal processor, (b) the design of the device's operating system and associated applications including the handling of TCP/IP communication. As a result, the many different mobile telephone devices have varying performance characteristics due to their design. Thus, different telephone devices operating in the same radio environment provide different qualities of communication.

As the mobile telephone networks have developed, various digital communication services have been introduced, including data communications and digital voice communications. Along with the conventional voice services provided in the past, mobile telephone devices are being used to access the internet, communicate text messages, video files, audio files, email and other data. Moreover, users often use mobile devices to access multiple services currently such as email, voice communications, web surfing, downloading file, watching video, SMS, etc. A challenge to mobile telephone device manufacturers, and to wireless carriers, is how to evaluate the relative performance of mobile telephone devices for the various voice and data services—especially when multiple services are used concurrently.

Another challenge is to objectively compare the communication quality of different mobile telephone devices in a consistent manner. Some embodiments of the present invention provide methods and systems to objectively test the qualities of service of different mobile telephone devices in varying environments when multiple communication services are provided concurrently. These and other advantageous may be provided by one or more embodiments of the present invention.

The invention will be better understood by reference to the following detailed description taken in conjunction with the accompanying drawings.

BRIEF DESCRIPTION OF THE DRAWINGS

The invention is further described in the detailed description that follows, by reference to the noted drawings by way of non-limiting illustrative embodiments of the invention, in which like reference numerals represent similar parts throughout the drawings. As should be understood, however, the invention is not limited to the precise arrangements and instrumentalities shown. In the drawings.

DETAILED DESCRIPTION OF ILLUSTRATIVE EMBODIMENTS

In the following description, for purposes of explanation and not limitation, specific details are set forth, such as particular networks, communication systems, computers, terminals, devices, components, techniques, telephone devices, mobile telephones, accessory devices, simulators, ear pieces, headsets, telephone handsets, data and network protocols, software products and systems, operating systems, development interfaces, hardware, etc. in order to provide a thorough understanding of the present invention.

However, it will be apparent to one skilled in the art that the present invention may be practiced in other embodiments that depart from these specific details. Detailed descriptions of well-known networks, communication systems, computers, telephone devices, mobile telephones, accessory devices, simulators, ear pieces, headsets, telephone handsets, terminals, devices, components, techniques, data and network protocols, software products and systems, development interfaces, operating systems, and hardware are omitted so as not to obscure the description of the present invention.

According to an embodiment of the present invention, the performance of a mobile telephone device, such as a mobile telephone, is evaluated for providing of various services concurrently. As used herein, "mobile telephone" means a telephone configured to communicate voice and data over a mobile telephone network. Other telephone devices include mobile telephone accessories (e.g., a wired or wireless) such as an earpiece, headset, speaker phone (e.g., that includes a microphone and which may be, for example, in an automobile, or other device), or other such device. A mobile telephone, also sometimes commonly referred to as a cell telephone, is a long-range, mobile electronic device used for mobile communications. In addition to providing the standard voice function of a telephone, many mobile telephones may support additional services such as SMS for text messaging, email, FTP, UDP, packet switching for access to the Internet, and MMS (Multimedia Messaging Service) for sending and receiving photos and video. A conventional mobile telephone may wirelessly communicate via a cellular network of base stations (cell sites), which is connected to the public switched telephone network (PSTN). A mobile telephone device, thus may include a mobile telephone alone, or in combination with an accessory.

Figure 1:
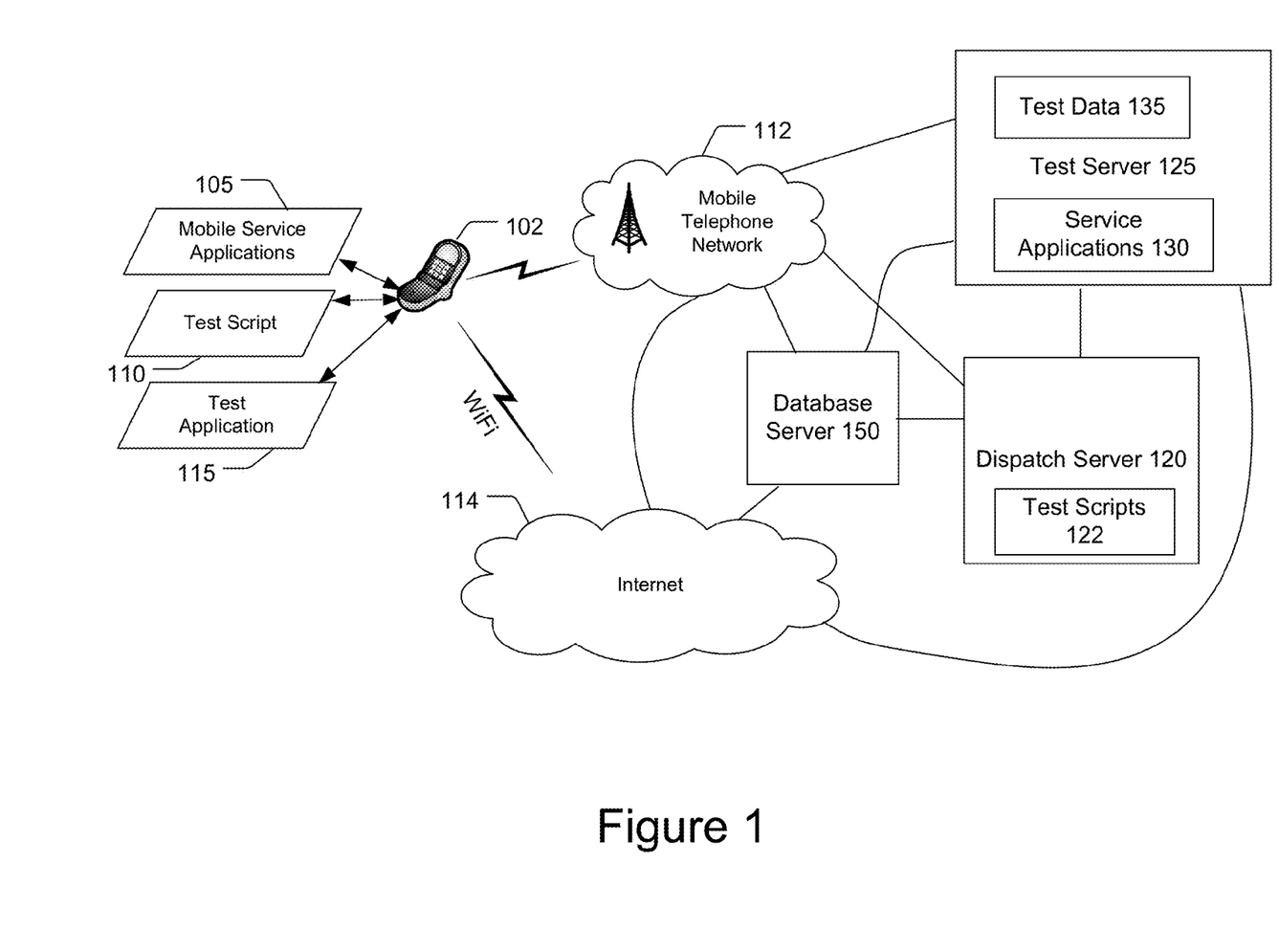
FIG. 1 is a block diagram of an example system for testing a mobile telephone device according to an example embodiment of the present invention.

Referring to FIG. 1, in an example embodiment a test application 115 and one or more test scripts 110 reside in the (non-transitory) memory of a mobile telephone device 102. Likewise, the servers described herein may include non-transitory memory for storing program code that is executed by one or more processors. The test application 115 executes the test script(s) 110 to invoke mobile service applications 105 to perform multiple mobile service tasks (e.g., email, SMS, voice telephone call, FTP, UDP, web surfing, downloading files, receive streaming video, etc.) concurrently. The mobile service applications 105, which comprise program code stored in non-transitory memory of the mobile telephone device 102, may be provided by the manufacturer of the mobile telephone device and/or install after manufacture or sale (e.g., by the consumer such as a VoIP application such as Skype®). Examples of mobile service applications include, but are not limited to, email clients, voice communications application, web browsers, VoIP applications, audio players, multimedia players, SMS clients, game applications, and others.

This example embodiment also includes a dispatch server 120 that stores test scripts 122 that may be distributed to mobile telephone devices 102 to be executed by the test application 115 to thereby perform the testing. This embodiment also may include a test server 125 that stores test data 135 and service applications 130. The service applications may include any suitable application desirable or needed to communicate with the mobile telephone device 102 and/or a mobile service application including, but not limited to, email clients, voice communications application, web browsers, VoIP applications, audio players, multimedia players, SMS clients, game applications, and others. The test data 135 may include a variety of content such as multimedia (e.g., video), audio (e.g., voice recordings), web pages, email content, and other content that may be communicated to the mobile telephone device 102 as part of a test. Likewise, the mobile telephone device 102 may store such test data. The system also may include a database server 150 that stores test results.

While FIG. 1 depicts separate servers, in practice the functions of the various servers may be performed by a single physical computer that uses different software (e.g., server software) to perform the associated functionality or multiple computers performing each function that are not co-located. In other words, the servers are depicted as separate components in FIG. 1 for ease of explanation, but any suitable means of providing the functions described herein may be employed and fall within the scope of the present invention. As used herein, the term "computer" is meant to include a computer system that includes one or more physically separate computing devices (e.g., servers, desk tops, lap tops, rack mounted, etc.) that may or may not be co-located with each other.

Figure 2:
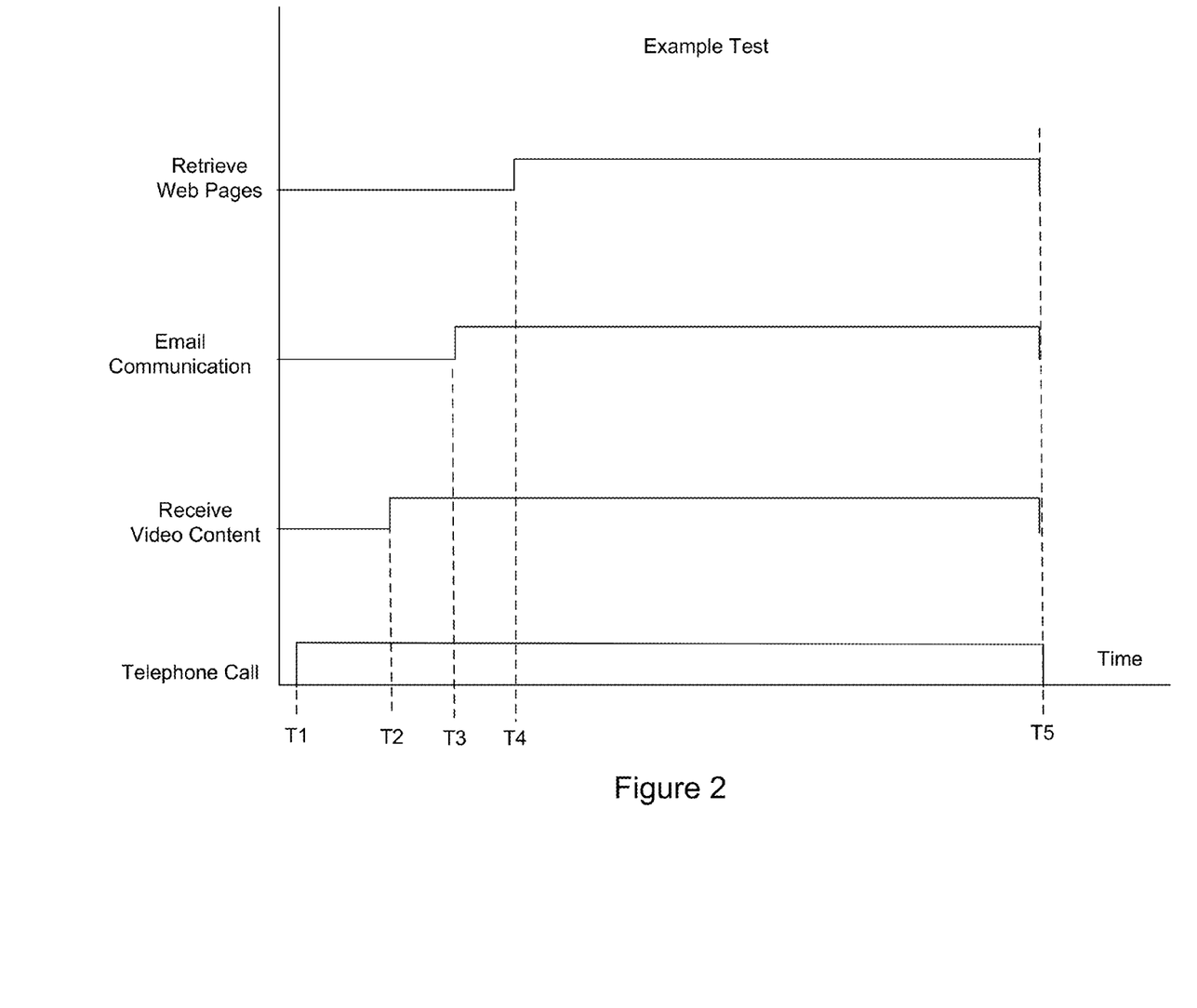
FIG. 2 illustrates an example test, according to an example embodiment of the present invention.

In one example embodiment, the test application 115 resident on the mobile telephone device 102 is initiated such as by receiving an input from a user or by wirelessly receiving a predetermined SMS message or other wireless message. The test application 115 causes one or more test scripts 110 to execute to perform multiple mobile service tasks concurrently. In this example, a first mobile service task may comprise establishing a voice telephone call, which as shown in FIG. 2 is initiated at time T1. To do so, in this example embodiment the mobile telephone device 102 may call the test server 125 to establish the telephone call via the mobile telephone network 112. An example mobile telephone network 112 may be based on any of various telecommunication standards, such as AMPS, D-AMPS, CDMA2000, GSM, GPRS, EV-DO, UMTS, WiMAX, G1, G1.5, G2, G3, G4, etc. In some embodiments, pre-stored test data (e.g., files) that comprise voice content or other such audio content sufficient for testing voice quality are communicated via the telephone call bi-directionally between the mobile telephone device 102 and the test server 125. By executing local program code (e.g., the test application 115) and/or remote program code, the incoming voice content received by each of the mobile telephone device 102 and the test server 125 may be regularly processed to determine the speech quality of the received voice content (such as a mean opinion score or MOS) and other metrics on an ongoing basis to provide a series of metrics over time for the duration of the telephone call. In some embodiments, the received audio content may be stored for processing after completion of the test so that processing of the audio content by the mobile telephone device 102 does not impact the performance of the mobile telephone device 102 during the test.

Figure 3:
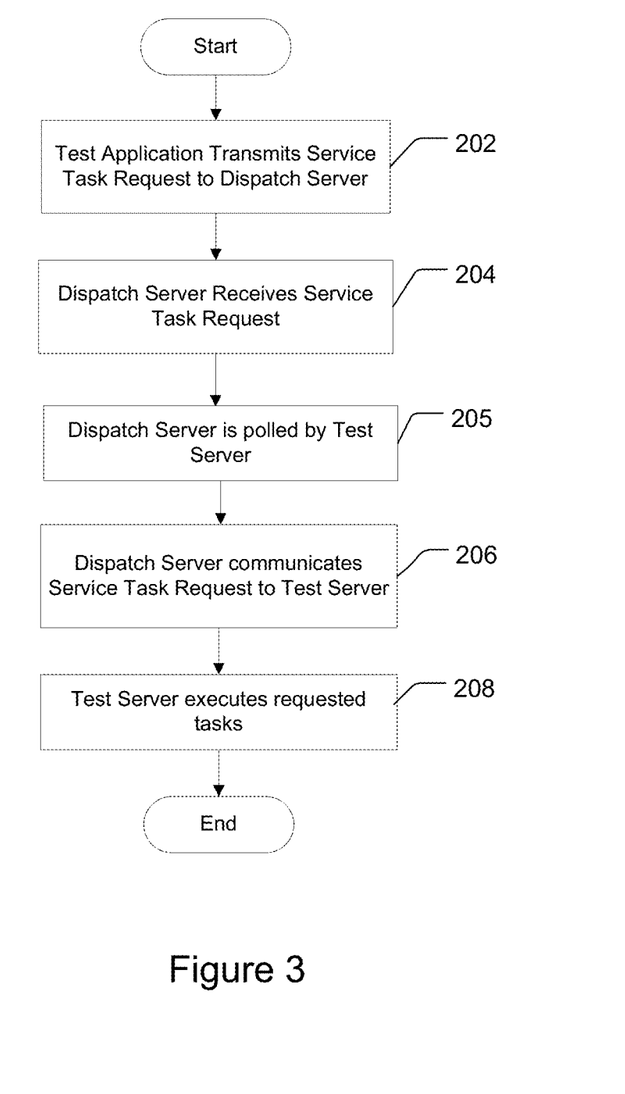
FIG. 3 illustrates an example method of testing a mobile telephone device, according to an example embodiment of the present invention.

A second mobile service task to be performed as part of the test may comprise receiving, and in some instances presenting (displaying) video content, which as shown in FIG. 2, is initiated at time T2. In one embodiment, referring to FIG. 3, the test application 115 resident on the mobile telephone device 102 causes the mobile telephone device 102 to transmit a service task request (e.g., a request to transmit video content to the mobile telephone device 102) to the dispatch server 120 (via the Internet 114 or mobile telephone network 112) at 202. The service task request is received by the dispatch server 120 at 204. At 205, the test server 125 may poll the dispatch server 120 to determine if any service tasks have been requested. Such polling may be on a continuous basis. If a service task request has been received by the dispatch server 120, at 206 information of the requested service task (e.g., transmit a particular video content to a particular mobile telephone device 102) is communicated to the test server 125 by the dispatch server 120. The test server 125 then performs the requested tasks at 208. The video content to be communicated may be stored as part of the test data 135 on the test server 125. In another embodiment, the mobile telephone device 102 transmits a request to the test server 125, which responds by transmitting the video content to the mobile telephone device 102. In yet another embodiment, the test server 125 receives a notification of a given test script by the mobile telephone device 102 and, based on the receipt of the notification, initiates transmission of the video content to the mobile telephone device 102 without the need to receive a request. The video content may be received via the mobile telephone network 112, via the Internet 114 (such as via WiFi connection of the mobile telephone device 102 to the Internet 114), via another network, or some combination thereof. It is worth noticing that the received video may be streaming video or downloaded video as desired by the tester. The video content to be communicated may be stored as part of the test data 135 on the test server 125.

As is evident from FIG. 2, the video content is received by the mobile telephone device 102 while the telephone call remains established and therefore the two mobile service tasks are performed concurrently. In other words, the voice telephone call may established over a first logical communication channel and the video content may received via a second logical communication channel. While the first logical channel was initiated prior to the second logical communication channel, both logical communication channels exist concurrently (i.e., after time T2).

By executing local program code (e.g., the test application 115) or remote program code, the incoming video content received by the mobile telephone device 102 may be processed to determine the quality of the received video content to provide a series of quality of service scores over time for the duration of the received video content. In this example embodiment, the test application 115 determines the quality of the received video content to provide a variety of service quality metrics, which are stored in memory of the mobile telephone device. In some embodiments, the received video content may be stored for processing after completion of the test so that processing of the video content by the mobile telephone device 102 does not impact the performance of the mobile telephone device 102 during the test.

A third mobile service task to be performed as part of the test may comprise receiving from the test server 125 (and/or transmitting to the test server 125) one or more emails, which as shown in FIG. 2, is initiated at time T3. The email content may comprise embedded image content (e.g., photos or videos), audio content, one or more attachments, text, and/or any other content in any way known to be communicated via email. The email content may be stored as part of the test data 135 on the test server 125 and stored on the mobile telephone device 102. If this portion of the test includes transmission of emails from the test server 125 to the mobile telephone device 102, the process of FIG. 3 may performed to initiate transmission of the emails to the mobile telephone device 102 by the test server 125. This task may comprise communication of a plurality of such emails by the mobile telephone device 102 and/or the test server 125. The communication of the email(s) may be considered a third logical communication channel that exists concurrently with the other two logical communication channels (i.e., after time T3). The email(s) and associated content may be communicated via the mobile telephone network 112, via the Internet 114 (such as via WiFi connection of the mobile telephone device 102 to the Internet 114), via another network, or some combination thereof.

By executing local program code (e.g., the test application 115) or remote program code, the incoming emails and email content received by the mobile telephone device 102 may be processed to determine the quality of the received emails and email content to provide a series of quality of service scores over time for the duration of the received emails. In some embodiments, the received email content may be stored for processing after completion of the test so that processing of the email content by the mobile telephone device 102 does not impact the performance of the mobile telephone device 102 during the test. Likewise, by executing program code on the test server 125, the outgoing emails and email content transmitted by the mobile telephone device 102 may be processed by the test server 125 to determine the quality of the transmitted emails and email content to provide a series of quality of service scores over time for the duration of the transmitted emails.

A fourth mobile service task to be performed as part of the test may comprise accessing a plurality of web pages (such as those hosted by the test server 125 or other web server), which as shown in FIG. 2, is initiated at time T4. To initiate this task, the mobile telephone device 102 may transmit a request for a first web page to the test server 125 (or other server). Immediately after receipt (or rendering (display) of the requested web page), a second web page may be requested. After receipt (or rendering) of the second web page, a third web page may be requested and so on. In some embodiments, the test server 125 transmits each web page after a predetermined time frame (e.g., three seconds) without the need to receive a request from the mobile telephone device 102. In other embodiments, each web page includes program code that when executed by the mobile browser causes the mobile telephone device 102 (i.e., the browser rendering the web page) to request the next web page. Thus, this task may comprise communication of a plurality of such web pages to the mobile telephone device 102 from the test server 125 or other server. The web pages may form part of the test data 135 stored on the test server 125. The communication of the web pages may be considered a fourth logical communication channel that exists concurrently with the other three logical communication channels (i.e., after time T4). The web pages may be received via the mobile telephone network 112, via the Internet 114 (such as via WiFi connection of the mobile telephone device 102 to the Internet 114), via another network, or some combination thereof.

By executing local program code (e.g., the test application 115) or remote program code, the web pages received by the mobile telephone device 102 may be processed to determine the quality of the received web pages to provide a series of quality of service scores over time for the duration of the received emails. In some embodiments, the received web pages may be stored, along with information on the timing of receipt of each web page, for processing after completion of the test so that processing of the web pages by the mobile telephone device 102 does not impact the performance of the mobile telephone device 102 during the test.

As is illustrated in FIG. 2, after a plurality of the mobile service tasks are performed concurrently for a predetermined time period (i.e., communication over a plurality of logical communication channels to provide different mobile services concurrently), the test may terminate such as at time T5. In some embodiments, only after conclusion of the test does the processing of the mobile service task data begin to determine the quality metrics. In other embodiments, some or all of the processing may performed "live" while the test is ongoing.

For each mobile service task performed, the following information may be determined (e.g., by the mobile telephone device via execution of the test application 115) and stored in memory of the mobile telephone device:

- The wireless service such as whether the service is WiFi or the type of broadband network (e.g., 2G, 3G, 4G, etc.).
- Service quality metrics such as speech quality, success/failure, error rate, bit transfer rate (e.g., peak and/or average throughput), connectivity (e.g., which may result in either success or failure), latency, jitter, connectivity loss, etc.
- Radio conditions such as signal strength, radio network bearer identifier, channel, cell ID, etc.
- Location of the mobile telephone such as latitude and longitude.

Additional and/or different data may also be collected. Information of the wireless service, the service quality metrics, the radio conditions and the location of the mobile telephone device may be communicated to the database server 150 for storage along with information identifying the mobile telephone device 102 (e.g., the telephone number of the mobile telephone device, International Mobile Equipment Identity (IMEI); model and serial numbers) and data of the model and manufacturer of the device 102, the mobile service applications used to perform the test (e.g., the browser, email client, etc.), and other such information.

The test server 125 also may execute program code to determine service quality metrics for communications received from the mobile telephone device 102, which may be stored along with the time and information identifying the device in the database server 150.

While the example test described above includes a telephone call, receiving (and displaying) video content, bi-directional email communication, and retrieving web pages, other tests may include other combinations of mobile service tasks that are performed concurrently. The sequence of mobile services may vary from test script to test script as well. For example, a test script may execute to cause the mobile device to call the server, start sending emails, download a file, end the call, wait ten seconds, make another call, stop downloading the file, stop sending emails, and stop the second call. Thus, a single test may include a series of mobile service tasks, with different services being performed concurrently with different other services at different times.

The same mobile telephone device may be tested at various locations within a given mobile telephone network. Similarly, different mobile telephone devices and different device configurations for a given mobile telephone may be tested to compare how well different devices and device configurations perform. Further, testing may be performed for different mobile telephone devices in different mobile telephone networks to determine and compare how well the mobile telephone devices perform among the different networks.

To access the test results a user may login to a database server 150 via the Internet 114. In an example embodiment, tests results from multiple tests may be grouped logically as projects. One or more users may be authorized to access the results. In addition to storing test results and allowing users to log in to access test results, the database server 150 also may perform post-processing operations to extract significant metrics, and to organize and report results. Results may be transmitted to the mobile telephone device 102 or other destination for viewing.

Various statistics may be derived from the various test results. Reports may aggregate statistics, for example, by the specific test, by the specific mobile telephone device 102, for a group of mobile telephone devices 12, for all mobile telephone devices 102 associated with a given project, etc. Mobile telephone devices 102 may be grouped, for example, by make, model, form factor, antenna type, network, band, radio technology, operating system, and/or chip set to allow comparisons.

As is evident from FIG. 2, the term "concurrently" is intended to mean that the service tasks exist during an overlapping time period and does not necessarily mean that the service tasks begin or stop at the same time. As an example, as shown in FIG. 2, all of the service tasks are performed concurrently between times T4 and T5. While the invention has been described in the context of testing the performance of a mobile telephone device, other (mobile) communication devices may be similarly tested such as tablet computers, notebook computers, portable computers, automobile integrated communication systems and the like. While in the above described embodiments the mobile device is communicating only with the test server, in other embodiments so communications (e.g., voice communications, video streaming) may be with the test server 125 and other communications (e.g., email, retrieving web pages, etc.) with one or more other remote computers.

As will be evident from the descriptions herein, one embodiment of the present invention may comprise a method of testing a mobile device configured to communicate over a mobile telephone network, comprising with the mobile device: wirelessly receiving a test script; executing a test application which executes the received test script; wherein execution of the test script by the test application causes two or more of the following tasks to execute concurrently: download a file; place a telephone call via the mobile telephone network; and retrieving web pages via the wireless network. The method may further comprise determining one or more quality of service metrics for each executed task; determining a plurality of radio metrics of the mobile device at execution of at least one of the tasks; determining data of a location of the mobile device at execution of at least one of the tasks; and transmitting data of the location of the mobile device, data of the radio metrics of the mobile device, and information of the quality of service metrics for each executed task to a computer system. In addition, the method may further comprise with the mobile device transmitting a request to receive data to a computer system and with the computer system, in response to receiving the request retrieving test data from memory; and transmitting the test data to the mobile device. In some embodiments, the method may further comprise with the mobile device: wirelessly receiving a message that comprises a test request; and in response to wirelessly receiving the message, performing said executing the test application. The method may further comprise with a dispatch server: receiving a service request from the mobile device; wherein the service request comprises a request to communicate data to the mobile device; communicating information of the service request to a test server; and (with the test server): receiving the information of the service request; and communicating the data to the mobile device.

The method may further comprise with a computer system transmitting the file to the mobile device; establishing a telephone call with the mobile device via the mobile telephone network; and wherein transmitting the file is performed while the telephone call is established and wherein the file is transmitted to the mobile device via a communication path that does not include the mobile telephone network. The method may further comprise with the computer system communicating the web pages to the mobile device; and wherein said communicating the web pages is performed concurrently with said transmitting the file and while the telephone call is established.

In yet another embodiment, a system for testing a mobile device configured to communicate over a wireless communication network, comprises a dispatch server storing a plurality of test scripts and configured to transmit test scripts to the mobile device; a test server configured to receive test scripts from said dispatch server and to execute received test scripts; the test server having access to test data for communication to the mobile device; wherein the tests scripts received by said test server are executable to cause said test server to concurrently communicate with the mobile device via multiple logical communication channels to test multiple mobile services of the mobile device concurrently; and a database configured to store: quality of service data associated with each mobile service of the mobile device tested; data of radio metrics of the mobile device; data of a location of the mobile device; and information identifying the mobile device. The mobile device may include non-transitory memory, the system may further comprise a test application stored in the memory of the mobile device and executable to cause the mobile device to: receive a test script from said dispatch server; execute the received test script to cause the mobile device to communicate via multiple wireless logical communication channels concurrently to perform multiple mobile services concurrently; determine a quality of service of each mobile service; determine data of a plurality of radio metrics of the mobile device; determine data of a location of the mobile device; and transmit data of the location of the mobile device, data of the radio metrics of the mobile device, and information of the quality of service of each mobile service to said database. The system may further comprise a test application stored in the memory of the mobile device and executable to cause the mobile device to receive at the mobile device program code for communicating with the test server to perform a first test; store the program code in memory of the mobile device; and execute the program code upon receipt of a test request and wherein receipt of the test request comprises receipt of a predetermined wireless message. A first logical communication channel may be configured to test a first mobile service that comprises voice communications; and a second logical communication channel may be configured to test a second mobile service that comprises accessing web content and wherein the first logical communication channel includes a portion of a mobile telephone network and the second logical communication channel does not include a portion of any mobile telephone network.

In yet another embodiment, a method of testing a mobile device configured to communicate over a mobile telephone network, comprises establishing a first logical communication channel via the mobile telephone network; communicating first information over the first logical communication channel; establishing a second logical communication channel over a communication network; concurrently with said communicating first information, communicating second information over the second logical communication channel; determining a plurality of service quality metrics for the first information communicated over the first logical communication channel; determining a plurality of service quality metrics for the second information communicated over the second logical communication channel; determining a location of the mobile device for communication of the first or second information; and determining information of the communication network over which the second information is communicated. The method may further comprise determining a plurality of radio conditions for communication of the first or second information as well as receiving at the mobile device program code for performing a first communication test; storing the program code in memory of the mobile device; and executing the program code upon receipt of a test request. The method may further comprise wirelessly receiving a message that comprises the test request. The method may further comprise receiving a SMS message that comprises a test request; and initiating the test in response to receiving the SMS message.

The processes of determining a plurality of service quality metrics for the first information, determining a plurality of service quality metrics for the second information, determining a location of the mobile device for communication of the first or second information; and determining information of the communication network may each performed by the mobile device. The method may further comprise concurrently with communicating the first information and communicating the second information, communicating third information over a third second logical communication channel.

It is to be understood that the foregoing illustrative embodiments have been provided merely for the purpose of explanation and are in no way to be construed as limiting of the invention. Words used herein are words of description and illustration, rather than words of limitation. In addition, the advantages and objectives described herein may not be realized by each and every embodiment practicing the present invention. Further, although the invention has been described herein with reference to particular structure, steps and/or embodiments, the invention is not intended to be limited to the particulars disclosed herein. Rather, the invention extends to all functionally equivalent structures, methods and uses, such as are within the scope of the appended claims. Those skilled in the art, having the benefit of the teachings of this specification, may affect numerous modifications thereto and changes may be made without departing from the scope and spirit of the invention.

What is claimed is:

1. A method of testing a mobile device configured to communicate over a mobile telephone network, comprising:
    with the mobile device;
    executing a test application which executes a test script stored on the mobile device;
    wherein execution of the test script by the test application causes two or more of the following tasks to execute concurrently:
        download a file;
        place a telephone call via the mobile telephone network; and
        retrieving web pages via a wireless network.

2. The method according to claim 1, further comprising:
    determining one or more quality of service metrics for each executed task; and
    transmitting information of the quality of service metrics for each executed task to a computer system.

3. The method according to claim 1, further comprising:
    determining a plurality of radio metrics of the mobile device at execution of at least one of the tasks; and
    transmitting data of the radio metrics of the mobile device for each executed task to a computer system.

4. The method according to claim 1, further comprising:
    determining data of a location of the mobile device at execution of at least one of the tasks; and
    transmitting data of the location of the mobile device for each executed task to a computer system.

5. The method according to claim 1, further comprising:
with the mobile device
transmitting a request to receive data to a computer system;
with the computer system, in response to receiving the request;
retrieving test data from memory; and
transmitting the test data to the mobile device.

6. The method according to claim 1, further comprising with the mobile device:
wirelessly receiving a message that comprises a test request; and
in response to wirelessly receiving the message, performing said executing the test application.

7. The method according to claim 1, further comprising:
with a dispatch server:
receiving a service request from the mobile device;
wherein the service request comprises a request to communicate data to the mobile device;
communicating information of the service request to a test server;
with the test server:
receiving the information of the service request; and
communicating the data to the mobile device.

8. The method according to claim 1, further comprising with a computer system:
transmitting the file to the mobile device;
establishing a telephone call with the mobile device via the mobile telephone network; and
wherein said transmitting the file is performed while the telephone call is established.

9. The method according to claim 8, wherein the file is transmitted to the mobile device via a communication path that does not include the mobile telephone network.

10. The method according to claim 8, further comprising with the computer system:
communicating the web pages to the mobile device; and
wherein said communicating the web pages is performed concurrently with said transmitting the file and while the telephone call is established.

11. A system for testing a mobile device configured to communicate over a wireless communication network, comprising:
a dispatch server storing a plurality of test scripts and configured to transmit test scripts to the mobile device;
a test server configured to receive test scripts from said dispatch server and to execute received test scripts;
said test server having access to test data for communication to the mobile device;
wherein the tests scripts received by said test server are executable to cause said test server to concurrently communicate with the mobile device via multiple logical communication channels to test multiple mobile services of the mobile device concurrently.

12. The system according to claim 11, further comprising;
a database configured to store:
quality of service data associated with each mobile service of the mobile device tested;
data of radio metrics of the mobile device;
data of a location of the mobile device; and
information identifying the mobile device.

13. The system according to claim 12, wherein the mobile device includes non-transitory memory, the system further comprising a test application stored in the memory of the mobile device and executable to cause the mobile device to:
receive a test script from said dispatch server;
execute the received test script to cause the mobile device to communicate via multiple wireless logical communication channels concurrently to perform multiple mobile services concurrently;
determine a quality of service of each mobile service;
determine data of a plurality of radio metrics of the mobile device; and
determine data of a location of the mobile device; and
transmit data of the location of the mobile device, data of the radio metrics of the mobile device, and information of the quality of service of each mobile service to said database.

14. The system according to claim 11, wherein the mobile device includes non-transitory memory, the system further comprising a test application stored in the memory of the mobile device and executable to cause the mobile device to:
receive at the mobile device program code for communicating with the test server to perform a first test;
store the program code in memory of the mobile device; and
execute the program code upon receipt of a test request.

15. The system according to claim 14, wherein receipt of the test request comprises receipt of a predetermined wireless message.

16. The system according to claim 11, wherein:
a first logical communication channel is configured to test a first mobile service that comprises voice communications; and
a second logical communication channel is configured to test a second mobile service that comprises accessing web content.

17. The system according to claim 16, wherein the first logical communication channel includes a portion of a mobile telephone network and the second logical communication channel does not include a portion of any mobile telephone network.

18. A method of testing a mobile device configured to communicate over a mobile telephone network, comprising:
establishing a first logical communication channel via the mobile telephone network;
communicating first information over the first logical communication channel;
establishing a second logical communication channel over a communication network;
concurrently with said communicating first information, communicating second information over the second logical communication channel;
determining a plurality of service quality metrics for the first information communicated over the first logical communication channel; and
determining a plurality of service quality metrics for the second information communicated over the second logical communication channel.

19. The method according to claim 18, further comprising:
determining a location of the mobile device for communication of the first or second information; and
determining information of the communication network over which the second information is communicated.

20. The method according to claim 18, further comprising determining a plurality of radio conditions for communication of the first or second information.

21. The method according to claim 18, further comprising:
receiving at the mobile device program code for performing a first communication test;

storing the program code in memory of the mobile device; and executing the program code upon receipt of a test request.

22. The method according to claim 21, further comprising wirelessly receiving a message that comprises the test request.

23. The method according to claim 18, further comprising:

receiving a SMS message that comprises a test request; and initiating the test in response to receiving the SMS message.

24. The method according to claim 18, wherein said determining a plurality of service quality metrics for the first information, said determining a plurality of service quality metrics for the second information, said determining a location of the mobile device for communication of the first or second information; and determining information of the communication network is each performed by the mobile device.

25. The method according to claim 18, further comprising concurrently with said communicating first information and communicating second information, communicating third information over a third second logical communication channel.

* * * * *